US006842184B2

(12) United States Patent
Huang et al.

(10) Patent No.: US 6,842,184 B2
(45) Date of Patent: Jan. 11, 2005

(54) THREE DIMENSIONAL STOCHASTIC SCREEN FOR LCD AND VIDEO

(75) Inventors: Jincheng Huang, Mountain View, CA (US); Joseph Shu, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 133 days.

(21) Appl. No.: 10/308,554

(22) Filed: Dec. 3, 2002

(65) Prior Publication Data

US 2004/0104918 A1 Jun. 3, 2004

(51) Int. Cl.[7] ................................................ G09G 5/02
(52) U.S. Cl. ...................... 345/596; 345/596; 345/643; 382/237; 358/1.9
(58) Field of Search ................................. 345/596–599; 358/3.13, 3.17, 3.14, 3.19; 348/574

(56) References Cited

U.S. PATENT DOCUMENTS

| | | | |
|---|---|---|---|
| 5,535,020 A | 7/1996 | Ulichney | 358/457 |
| 5,745,259 A | 4/1998 | Ulichney | 358/457 |
| 5,912,745 A | 6/1999 | Ulichney | 358/457 |
| 6,008,794 A | 12/1999 | Ishii | 345/150 |
| 6,088,512 A | 7/2000 | Ancin et al. | 395/109 |
| 6,094,187 A | 7/2000 | Jones et al. | 345/147 |
| 6,147,671 A | 11/2000 | Agarwal | 345/149 |
| 6,172,773 B1 | 1/2001 | Ulichney | 358/457 |
| 6,690,389 B2 * | 2/2004 | Ulichney | 345/691 |
| 6,710,778 B2 * | 3/2004 | Cooper | 345/596 |
| 6,714,320 B1 * | 3/2004 | Nakahara et al. | 358/3.13 |
| 6,791,718 B1 * | 9/2004 | Allebach et al. | 358/3.13 |

FOREIGN PATENT DOCUMENTS

EP     0 953 956 A1    11/1999    ............ G09G/3/20

OTHER PUBLICATIONS

Veryovka, O. and Buchanan, J.; "Comprehensive Halftoning of 3D Scenes;"Department of Computing Science, University of Alberta; 1999□□http://pages.cpsc.ucalgary.ca/~jungle/skigraph99/papers/veryovka.pdf.*

The void–and–cluster method for dither array generation, Robery Ulichney, Digital Equipment Corporation Maynard, MA 01754–2571 (SPIE vol. 1913, pp. 332–343) (Sep. 1993).

* cited by examiner

Primary Examiner—Matthew C. Bella
Assistant Examiner—A. Brautigam
(74) Attorney, Agent, or Firm—Mark P. Watson

(57) ABSTRACT

A dither matrix generator defines a three-dimensional array of pixels referred to as the "cluster array" in which each pixel is designated based on its value as a "cluster pixel" or a "void pixel". The dither matrix generator also defines a three-dimensional array referred to as the "dither matrix," and assigns rank values to the dither matrix in two stages. In the first stage, the dither matrix generator identifies the largest cluster in the cluster array, identifies a cluster pixel located in the largest cluster, assigns a rank value to the element in the dither matrix corresponding to the cluster pixel and removes the cluster pixel from the cluster array. The process is repeated until the cluster array contains no cluster pixels. In the second stage, the dither matrix generator resets the pixels in the cluster array to their initial values, identifies the largest void in the cluster array, identifies a void pixel within the largest void, assigns a rank value to the element in the dither matrix corresponding to the void pixel and inserts a cluster pixel in the location of the void pixel. The process is repeated until the cluster array contains only cluster pixels.

12 Claims, 8 Drawing Sheets

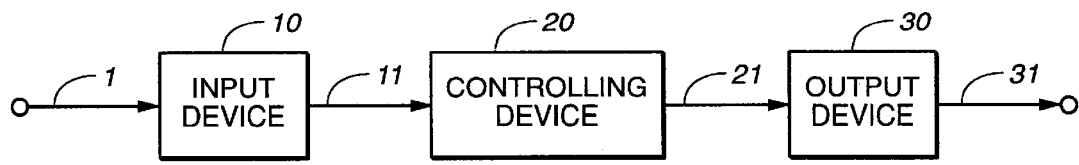
FIG._1
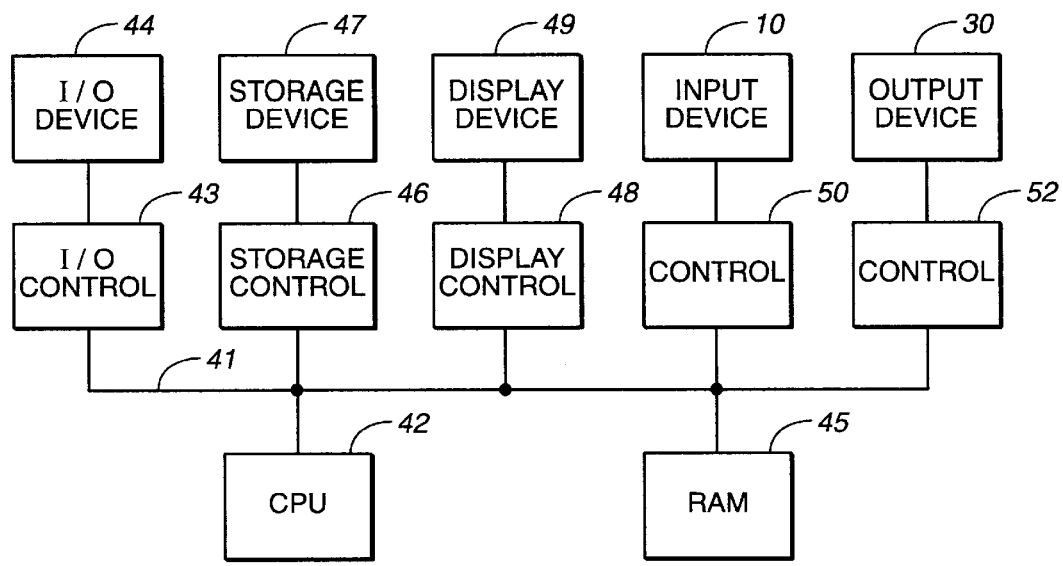
FIG._2
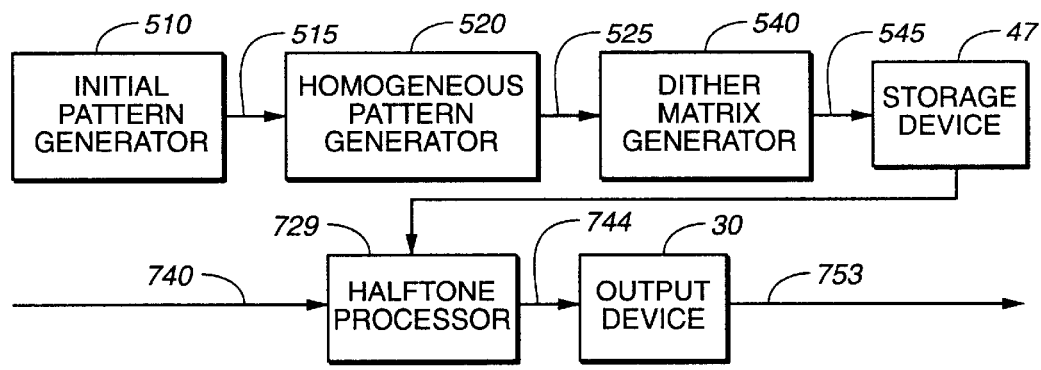
FIG._3

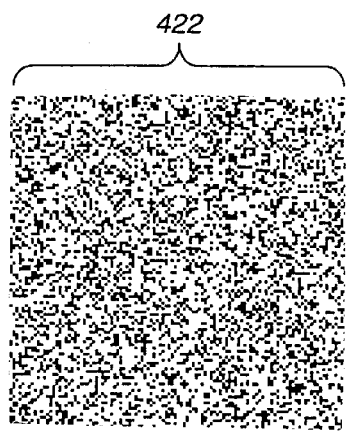
FIG._4A
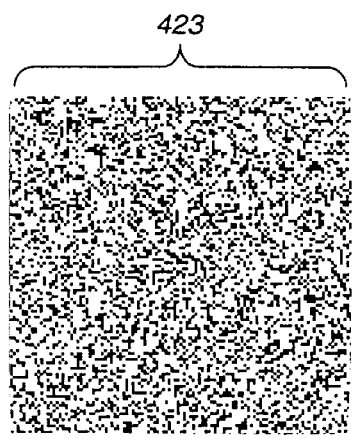
FIG._4B
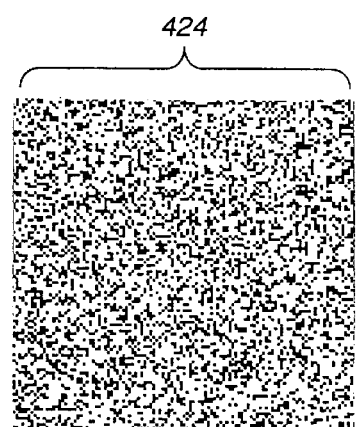
FIG._4C
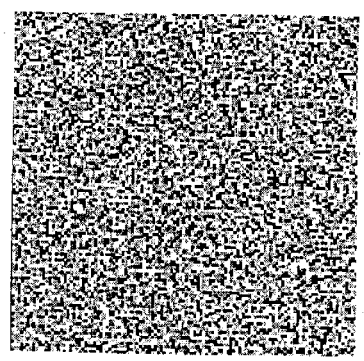
FIG._4D
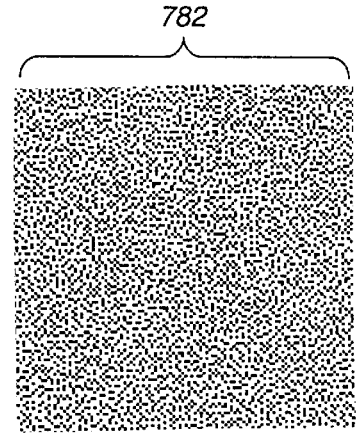
FIG._7A
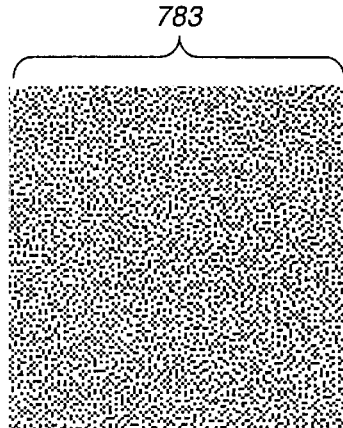
FIG._7B
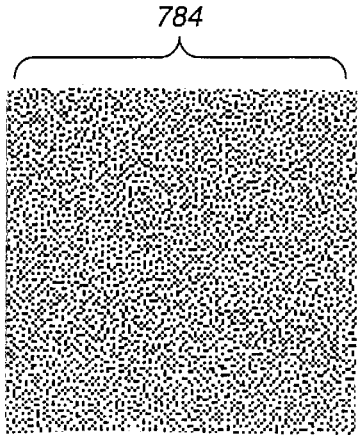
FIG._7C
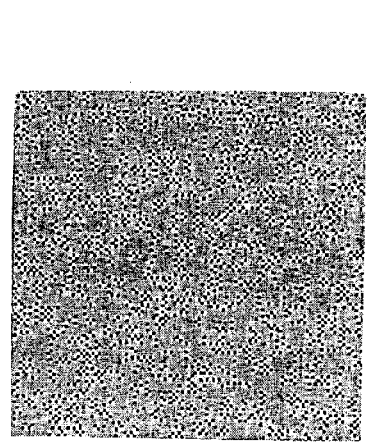
FIG._7D

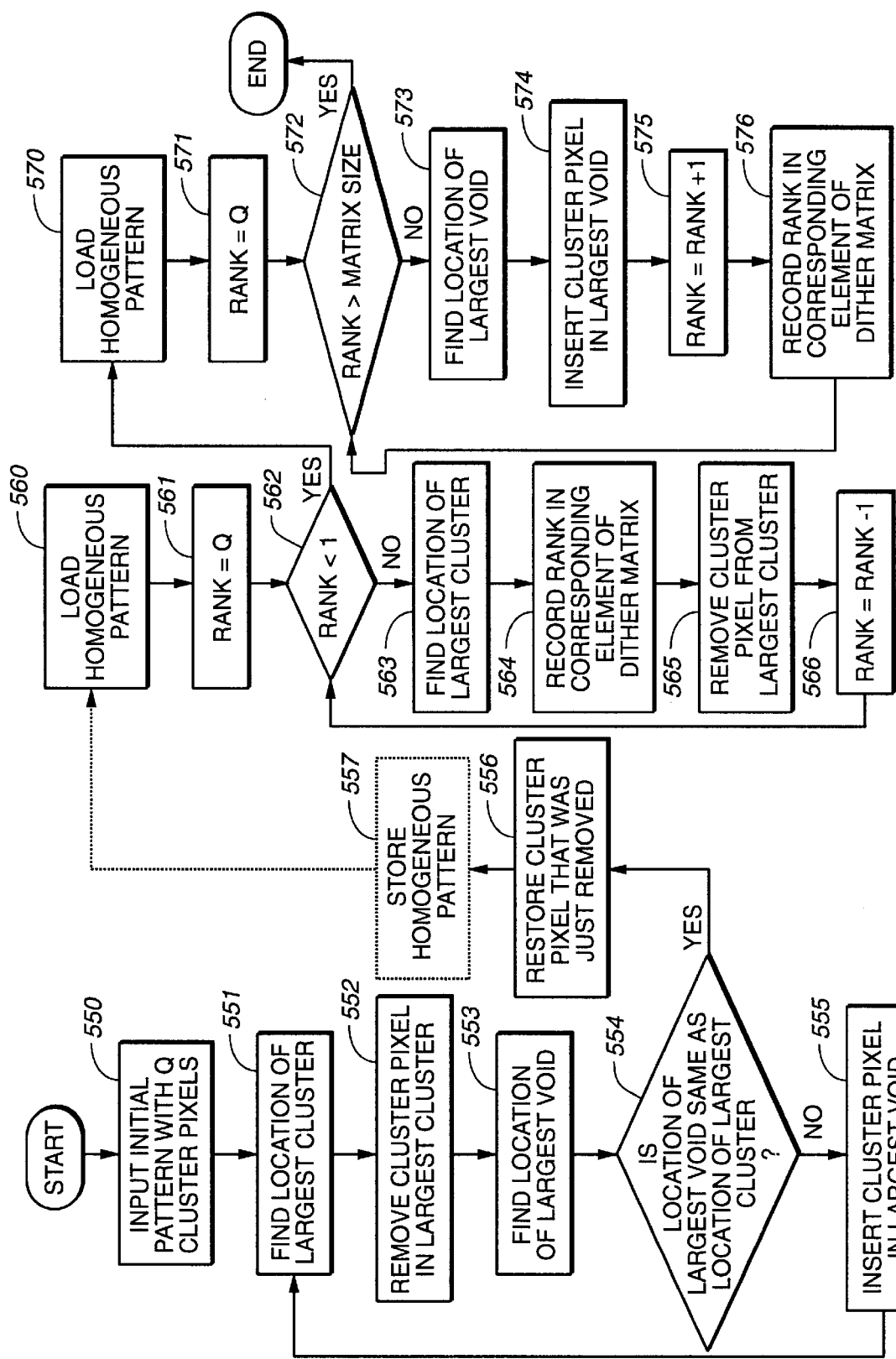
FIG._5

|   |   |   |   |   |   |
|---|---|---|---|---|---|
| 0 | 1 | 0 | 0 | 1 | 0 |
| 0 | 0 | 0 | 0 | 0 | 0 |
| 1 | 1 | 0 | 1 | 0 | 0 |
| 1 | 0 | 1 | 1 | 1 | 0 |
| 0 | 1 | 1 | 1 | 0 | 1 |
| 1 | 1 | 0 | 1 | 0 | 1 |

FIG._6A

|   |   |   |   |   |   |
|---|---|---|---|---|---|
| 2.2 | 2.1 | 1.4 | 1.6 | 1.6 | 1.9 |
| 1.4 | 1.9 | 1.9 | 1.1 | 1.1 | 0.6 |
| 2.6 | 2.4 | 2.7 | 2.4 | 1.9 | 1.4 |
| 2.7 | 3.8 | 3.8 | 4.5 | 2.7 | 2.7 |
| 3.8 | 3.5 | 4.3 | 4.0 | 3.3 | 2.7 |
| 3.5 | 3.7 | 3.3 | 2.4 | 3.0 | 2.9 |

FIG._6E

|   |   |   |
|---|---|---|
| 0.3 | 0.8 | 0.3 |
| 0.8 | 1.0 | 0.8 |
| 0.3 | 0.8 | 0.3 |

FIG._6B

| 0.3 | 0.8 | 0.3 |   | 1 | 1 | 1 |
|---|---|---|---|---|---|---|
| 0.8 | 1.0 | 0.8 | * | 0 | 0 | 1 |
| 0.3 | 0.8 | 0.3 |   | 0 | 0 | 0 |

| 705 | | | | | | 727 | | | | | |
|---|---|---|---|---|---|---|---|---|---|---|---|
| 0 | 1 | 0 | 0 | 1 | 0 | 0 | 1 | 0 | 0 | 1 | 0 |
| 0 | 0 | 0 | 0 | 0 | 0 | 0 | 0 | 0 | 0 | 0 | 0 |
| 1 | 1 | 0 | 1 | 0 | 0 | 1 | 1 | 0 | 1 | 0 | 0 |
| 1 | 0 | 1 | 1 | 1 | 0 | 1 | 0 | 1 | 1 | 1 | 0 |
| 0 | 1 | 1 | 1 | 0 | 1 | 0 | 1 | 1 | 1 | 0 | 1 |
| 1 | 1 | 0 | 1 | 0 | 1 | 1 | 1 | 0 | 1 | 0 | 1 |
| 0 | 1 | 0 | 0 | 1 | 0 | 0 | 1 | 0 | 0 | 1 | 0 |
| 0 | 0 | 0 | 0 | 0 | 0 | 0 | 0 | 0 | 0 | 0 | 0 |
| 1 | 1 | 0 | 1 | 0 | 0 | 1 | 1 | 0 | 1 | 0 | 0 |
| 1 | 0 | 1 | 1 | 1 | 0 | 1 | 0 | 1 | 1 | 1 | 0 |
| 0 | 1 | 1 | 1 | 0 | 1 | 0 | 1 | 1 | 1 | 0 | 1 |
| 1 | 1 | 0 | 1 | 0 | 1 | 1 | 1 | 0 | 1 | 0 | 1 |

| | | | | |
|---|---|---|---|---|
| 0.02 | 0.08 | 0.14 | 0.08 | 0.02 |
| 0.08 | 0.37 | 0.61 | 0.37 | 0.08 |
| 0.14 | 0.61 | 1.00 | 0.61 | 0.14 |
| 0.08 | 0.37 | 0.61 | 0.37 | 0.08 |
| 0.02 | 0.08 | 0.14 | 0.08 | 0.02 |

*FIG._8A*

| | | | | |
|---|---|---|---|---|
| 0.01 | 0.05 | 0.08 | 0.05 | 0.01 |
| 0.05 | 0.22 | 0.37 | 0.22 | 0.05 |
| 0.08 | 0.37 | 0.61 | 0.37 | 0.08 |
| 0.05 | 0.22 | 0.37 | 0.22 | 0.05 |
| 0.01 | 0.05 | 0.08 | 0.05 | 0.01 |

*FIG._8B*

| | | | | |
|---|---|---|---|---|
| 0.02 | 0.08 | 0.14 | 0.08 | 0.02 |
| 0.08 | 0.37 | 0.61 | 0.37 | 0.08 |
| 0.14 | 0.61 | 1.00 | 0.61 | 0.14 |
| 0.08 | 0.37 | 0.61 | 0.37 | 0.08 |
| 0.02 | 0.08 | 0.14 | 0.08 | 0.02 |

*FIG._9A*

| | | | | |
|---|---|---|---|---|
| 0.00 | 0.00 | 0.00 | 0.00 | 0.00 |
| 0.00 | 0.00 | 0.00 | 0.00 | 0.00 |
| 0.00 | 0.00 | $\frac{\alpha}{2.0}$ | 0.00 | 0.00 |
| 0.00 | 0.00 | 0.00 | 0.00 | 0.00 |
| 0.00 | 0.00 | 0.00 | 0.00 | 0.00 |

*FIG._9B*

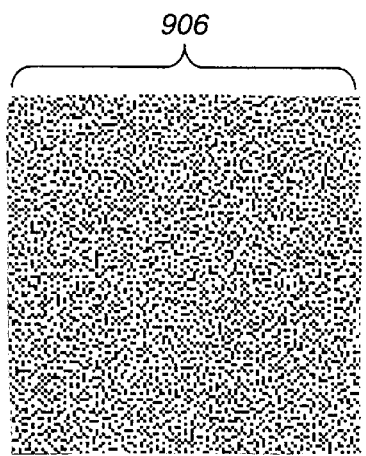
FIG._10A
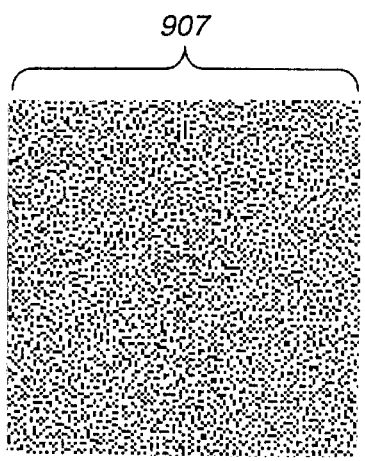
FIG._10B
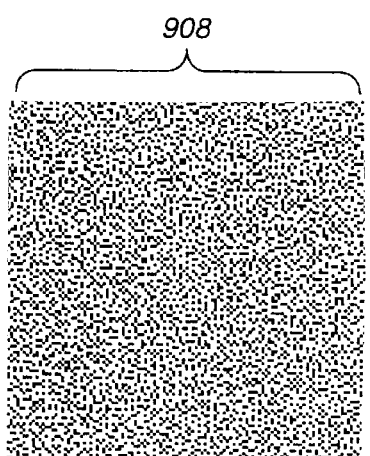
FIG._10C
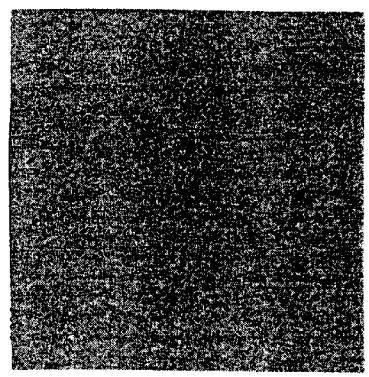
FIG._10D
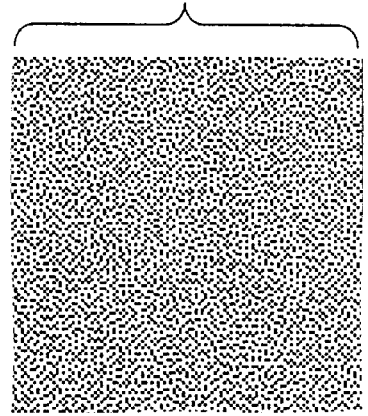
FIG._11A
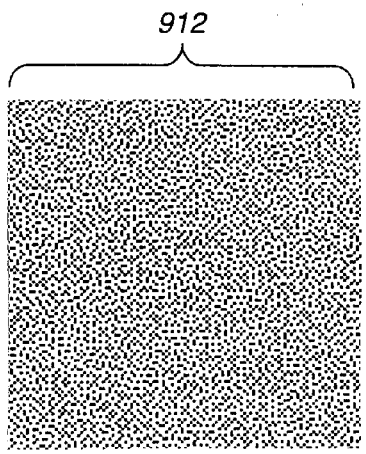
FIG._11B
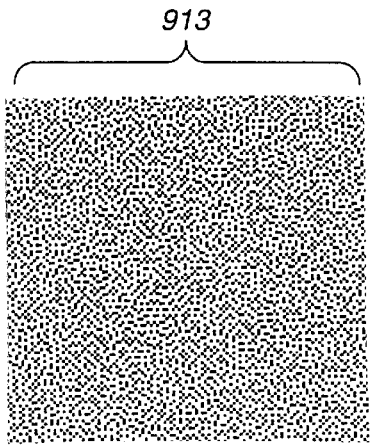
FIG._11C
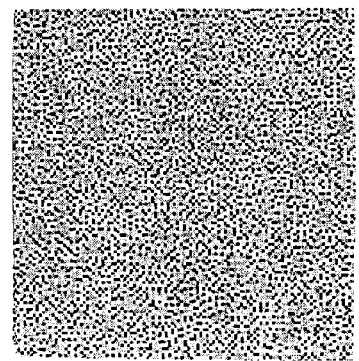
FIG._11D

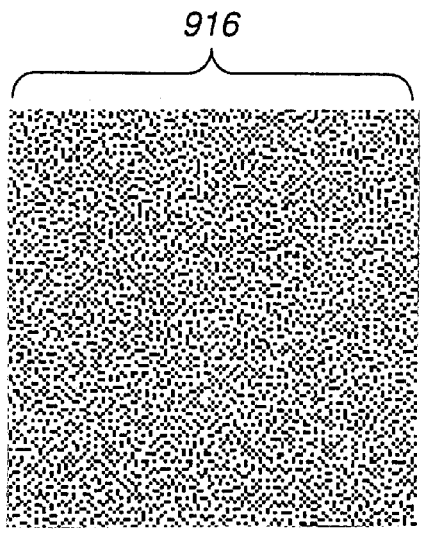
FIG._12A
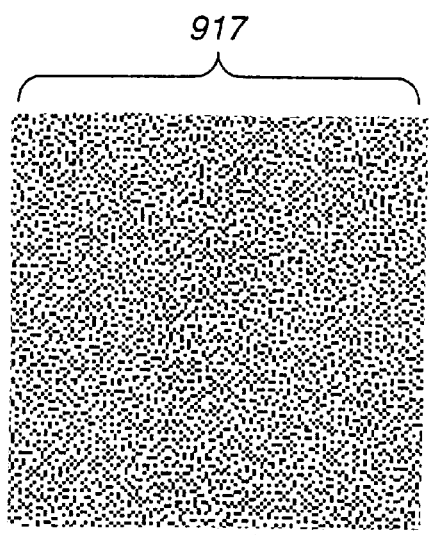
FIG._12B
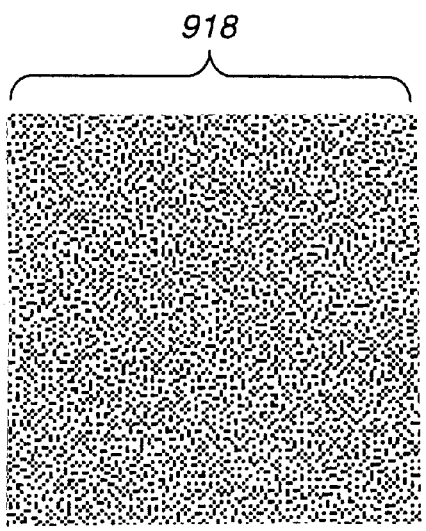
FIG._12C
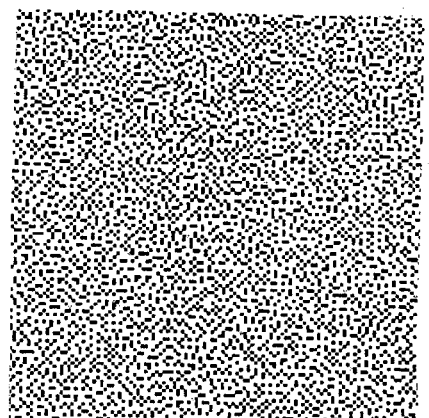
FIG._12D

THREE DIMENSIONAL STOCHASTIC SCREEN FOR LCD AND VIDEO

TECHNICAL FIELD

The invention relates to the processing of image data for the purpose of enhancing the appearance of three-dimensional image data presented in the form of video or by a device such as a liquid crystal display ("LCD").

BACKGROUND ART

Many devices designed to generate color images from rasterized image data cannot fully utilize the color information present in the image data. Some devices have technical limitations that prevent them from generating the full range of colors represented in the image data. For example, in some rasterized image data a respective pixel's color information includes data for three component colors such as red, green and blue, and the intensity of each of the three colors is represented by eight bits, allowing for 256 possible levels of intensity for each component color. If an image represented in this way is displayed on a device capable of generating only eight different levels of intensity for each component color, a significant amount of color information is lost. In such cases, the color information is typically quantized using a quantization method such as uniform quantization, allowing the device to display an image using fewer colors than are present in the image data. In addition to eliminating color information from the image, quantization methods frequently result in the appearance within the output image of visual artifacts. For example, an effect known as contouring may occur if the quantization of the image data causes visible transitions between color levels.

The need to optimize the color capabilities of a display device arises not only in the display of two-dimensional ("2-D") image data but also in the presentation of three-dimensional ("3-D") image data such as video. As used herein, the term "3-D image data" refers to digital image data in which the color of a pixel is a function not only of two spatial coordinates but also of a time coordinate. When 3-D image data is presented on a display device such as a LCD or computer monitor, a single pixel on the screen may display different colors as time progresses. An array of pixels having the same time coordinate is commonly referred to as a "frame". Multiple frames are typically displayed, or "cycled," in rapid succession to generate a moving image.

One technique used to expand the range of colors achievable by a device with limited color capability is known as 3-D screening. Generally, screening techniques exploit characteristics of the human eye to expand the color output of a device beyond its inherent color capabilities. If the human eye views a pattern of sufficiently small dots having different colors, the viewer generally does not perceive the colors of the individual dots but instead perceives a color approximately equal to the average color of the dots in the pattern. The human eye's ability to perceive the average color operates spatially, when the eye views a small array of dots on a display device, and over time, when the eye views an array of pixels whose colors are rapidly changing. In either case, the eye typically perceives a color that is approximately equal to the average color of the pixels viewed. The color perceived by a viewer is referred to as the "effective color output." Screening techniques that are used to generate moving images typically construct three-dimensional arrays of values, or "screens," which can be used to generate within an array of pixels a pattern of colors with a desired effective color output. These techniques enable a device to expand the number of colors it can display by generating a display that appears to have additional color levels intermediate to those defined by the device's physical characteristics.

A common 3-D screening technique known as frame rate modulation ("FRM") turns a pixel alternately on and off across multiple frames, producing an effective color output that is approximately equal to the average color measured over a series of frames. The term "refresh rate" refers to the frequency at which the output of a single pixel alternates between different color levels. Increasing the refresh rate can enable a device to display a greater number of intermediate colors and can provide greater control over the effective color output.

An additional factor that influences the perceived quality of the color output is the perceived uniformity of the color pattern. It is preferable in presenting 3-D image data to use a screen that produces color patterns having a high degree of uniformity. Known FRM techniques are inconsistent in their ability to produce uniform patterns.

There is a need to develop an improved 3-D screening technique that increases the number of color levels that a device may generate in presenting 3-D image data and provides greater control over the uniformity of the color pattern displayed, while minimizing the appearance of artifacts.

DISCLOSURE OF INVENTION

It is an object of the present invention to enable a display device to generate multiple color levels for use in presenting 3-D image data by generating a three-dimensional screen from an arbitrary three-dimensional color pattern.

An initial pattern generator defines a three-dimensional array of pixels referred to as the "initial pattern." Using the initial pattern as a starting point, a homogeneous pattern generator defines a three-dimensional array of pixels referred to as a "cluster array," utilizes a filter to identify the largest cluster in the cluster array, removes a cluster pixel located in the largest cluster, identifies the largest void in the cluster array, and places a cluster pixel in the largest void. The homogeneous pattern generator continues to move cluster pixels from the largest cluster to the largest void until the step of removing a cluster pixel from the largest cluster creates the largest void. When this occurs, the process is complete and the modified cluster array is referred to as the homogeneous pattern. A dither matrix generator defines a three-dimensional array referred to as the "dither matrix," and assigns rank values to the dither matrix in two stages. In the first stage, the dither matrix generator identifies the largest cluster in the homogeneous pattern, identifies a cluster pixel located in the largest cluster and assigns a rank value to the element in the dither matrix corresponding to the cluster pixel. The cluster pixel is then removed from the homogeneous pattern. The process is repeated until the homogeneous pattern contains no cluster pixels. In the second stage, the dither matrix generator resets the pixels in the homogeneous pattern to their initial values, identifies the largest void in the homogeneous pattern, identifies a void pixel within the largest void and inserts a cluster pixel in the location of the void pixel. The dither matrix generator assigns a rank value to the element in the dither matrix corresponding to the void pixel. The process is repeated until the homogeneous pattern contains only cluster pixels.

BRIEF DESCRIPTION OF DRAWINGS

FIG. 1 illustrates major components in a typical image reproduction system.

FIG. 2 illustrates major components in a typical personal computer system.

FIG. 3 is a block diagram of a system that may be used to carry out various aspects of the invention.

FIGS. 4(a)–4(c) show three frames of a random pattern that may be used as an initial pattern.

FIG. 4(d) shows an image generated by averaging the values of the pixels in the frames shown in FIGS. 4(a)–4(c).

FIG. 5 shows a flowchart summarizing the steps performed by the homogeneous pattern generator and by the dither matrix generator.

FIG. 6(a) shows schematically a two-dimensional cluster array of binary values.

FIG. 6(b) shows schematically a filter that may be applied to the cluster array of FIG. 6(a) to identify a largest cluster or a largest void.

FIG. 6(c) shows schematically the cluster array of FIG. 6(a) duplicated four times.

FIG. 6(d) shows numerically the details of the application of the filter shown in FIG. 6(b) to a region of the cluster array of FIG. 6(a).

FIG. 6(e) shows schematically an array of total density values for the pixels in the cluster array shown in FIG. 6(a).

FIGS. 7(a)–7(c) show three frames of a homogeneous pattern generated from the initial pattern shown in FIGS. 4(a)–4(c).

FIG. 7(d) shows an image generated by averaging the values of the pixels in the frames shown in FIGS. 7(a)–7(c).

FIGS. 8(a) and 8(b) show example values of a Gaussian filter.

FIGS. 9(a) and 9(b) show example values of a filter.

FIGS. 10(a)–10(c) show three frames of a homogeneous pattern generated from the initial pattern shown in FIGS. 4(a)–4(c).

FIG. 10(d) shows an image generated by averaging the values of the pixels in the frames shown in FIGS. 10(a)–10(c).

FIGS. 11(a)–11(c) show three frames of a homogeneous pattern generated from the initial pattern shown in FIGS. 4(a)–4(c).

FIG. 11(d) shows an image generated by averaging the values of the pixels in the frames shown in FIGS. 11(a)–11(c).

FIGS. 12(a)–12(c) show three frames of a homogeneous pattern generated from the initial pattern shown in FIGS. 4(a)–4(c).

FIG. 12(d) shows an image generated by averaging the values of the pixels in the frames shown in FIGS. 12(a)–12(c).

MODES FOR CARRYING OUT THE INVENTION

System Overview

FIG. 1 illustrates major components in a typical image reproduction system. Input device 10 receives from path 1 signals representing an original image and generates along path 11 a rasterized representation of the original image. Controlling device 20 receives this representation from path 11 and, in response, generates along path 21 an output-device-dependent representation of the original image. Output device 30 receives this representation from path 21 and, in response, generates along path 31 a representation of the original image. The present invention is directed toward improving the perceived quality of the representation produced by the output device.

Input device 10 may be a software application capable of generating three-dimensional graphics images. Alternatively, input device 10 may be an apparatus capable of generating three-dimensional photographic images such as a video camera. If input device 10 is a software application for creating images, the signals received from path 1 could represent commands or data for the application.

Output device 30 may be any type of device that is capable of presenting video or three-dimensional graphic images. Output device 30 may be an LCD device, for example, or alternatively, a computer monitor.

Controlling device 20 is responsible for transforming the rasterized representation of the original image received from path 11 into an output-device-dependent representation of the original image. Controlling device 20 may be implemented by software and/or hardware in a general-purpose computer such as that illustrated in FIG. 2.

FIG. 2 illustrates major components in a typical personal computer system that may be used to carry out various aspects of the invention. CPU 42 provides computing resources. I/O control 43 represents an interface to I/O device 44 such as a keyboard, mouse or modem. RAM 45 is system random access memory. Storage control 46 represents an interface to storage device 47 that includes a storage medium such as magnetic tape or disk, or an optical medium. The storage medium may be used to record programs of instructions for operating systems, utilities and applications, and may include programs that implement various aspects of the present invention. Display control 48 provides an interface to display device 49. Display device may be any type of visual display device. Control 50 represents an interface to input device 10 such as a software application capable of generating graphics images, or a video camera. Control 52 represents an interface to output device 30 such as an LCD device.

In FIG. 2, all major system components connect to bus 41, which may represent more than one physical bus. A bus architecture is not required to practice the present invention.

The functions of one or more computer components as well as various aspects of the present invention can be implemented in a wide variety of circuitry including discrete logic components, one or more ASICs and/or software-controlled processors. For example, controlling device 20 may be implemented by a special-purpose device. The manner in which controlling device 20 is implemented is not important to the present invention. Other implementations including digital and analog processing circuitry may be used. Software implementations of the present invention may be conveyed by a variety of machine-readable media such as baseband or modulated communication paths throughout the spectrum including from supersonic to ultraviolet frequencies, or storage media including those that convey information using essentially any magnetic or optical recording technology including magnetic tape, magnetic disk, and optical disc.

FIG. 3 is a block diagram of a system that may be used to carry out various aspects of the invention. An initial pattern generator 510 generates data representing a pattern of values and transmits data along path 515 to a homogeneous pattern generator 520. The homogeneous pattern generator 520 processes the data received along path 515 and transmits data along path 525 to a dither matrix generator 540. The dither matrix generator 540 utilizes the data received along path 525 to generate a three-dimensional screen and transmits data representing the screen along path 545 to a storage device 47. A halftone processor 729 receives rasterized three-dimensional image data along path 740, accesses the data representing the screen in the storage device 47 and transmits along path 744 to output device 30 a halftoned representation of the image. The output device 30 generates an output image along path 753. In a preferred implementation, the initial pattern generator 510, the homogeneous pattern generator 520 and the dither matrix generator 540 are implemented by one or more software applications incorporated within controlling device 20. Alternatively, the initial pattern generator 510, the homogeneous pattern generator 520 and the dither matrix generator 540 are implemented by digital or analog circuitry incorporated within controlling device 20. In another implementation, the initial pattern generator 510, the homogeneous pattern generator 520 and the dither matrix generator 540 are incorporated within output device 30 and are implemented by one or more software applications executable by output device 30 or by digital or analog circuitry. In yet another implementation, the initial pattern generator 510, the homogeneous pattern generator 520 and the dither matrix generator 540 are incorporated in controlling device 20 and the storage device 47 and halftone processor 729 are incorporated within output device 30.

Initial Pattern Generator

The initial pattern generator 510 defines a three-dimensional array of pixels of dimensions M×N×T, where M and N represent two spatial dimensions and T represents the time dimension. The three-dimensional array of pixels is referred to as the "initial pattern." Values for the pixels in the initial pattern may be generated in an arbitrary manner. In a preferred implementation, each pixel in the initial pattern has a binary value. In this implementation, a pixel with a binary value of one is referred to as a "cluster pixel" and a pixel with a binary value of zero is referred to as a "void pixel". FIGS. 4(a)–4(c) show a first frame 422, second frame 423 and third frame 424 of a random pattern of dimensions 128×128×3 that may be used as an initial pattern. FIG. 4(d) shows an image generated by averaging the pixel values in frames 422, 423 and 424, and represents the image seen by a viewer if frames 422, 423 and 424 are presented in rapid succession. In an alternative implementation, pixels in the initial pattern have non-binary values, in which cluster pixels and void pixels are defined as pixels having values within specified ranges.

Homogeneous Pattern Generator

FIG. 5 shows a flowchart summarizing the steps performed by the homogeneous pattern generator 520 and by the dither matrix generator 540. Steps 550–557 are performed by the homogeneous pattern generator 520. In the preferred implementation, the homogeneous pattern generator 520 defines a M×N×T array, referred to as a "cluster array." In step 550, the homogeneous pattern generator 520 copies the initial pattern into the cluster array by assigning to each pixel in the cluster array the value of the corresponding pixel in the initial pattern.

Identification of Largest Cluster

The homogeneous pattern generator 520 transforms the cluster array into a homogeneously distributed pattern in the following manner. In step 551, the homogeneous pattern generator 520 identifies the largest cluster in the cluster array. In the preferred implementation, the largest cluster is identified by means of a filter. If a X×Y×Z filter is utilized, a X×Y×Z filter window is dragged pixel by pixel through the three dimensions of the cluster array such that every X×Y×Z set of adjacent pixels, or region, within the cluster array is examined. The homogeneous pattern generator 520 applies the filter to a region by convolving the filter function with the pixel values in the region to produce an output value. A pixel in the region is selected and designated the region's "central pixel." The selection of a region's central pixel may be arbitrary or may be determined by the characteristics of the filter or by other factors. The output value generated from a respective region is referred to as a "total density value" and is associated with the region's central pixel. FIG. 6(a) shows schematically a two-dimensional 6×6 cluster array 705 of binary values. A portion of the pixels, including pixel 723, have a value of zero. Other pixels, including pixel 724, have a value of one. FIG. 6(b) shows schematically a 3×3 filter 710 that may be applied to the cluster array 705 shown in FIG. 6(a) to identify a largest cluster. Although for purposes of illustration a two-dimensional cluster array 705 and a two-dimensional filter 710 are shown in FIGS. 6(a) and 6(b), respectively, the process of applying a three-dimensional filter to a three-dimensional cluster array proceeds in the same manner as in two dimensions. If necessary, the cluster array is duplicated multiple times to allow the filter to generate total density values for border pixels by wrapping around. FIG. 6(c) shows schematically the cluster array 705 duplicated four times to illustrate the application of the filter 710 to a region 727 of nine pixels centered around pixel 723. The filter 710 is convolved with the values within the region 727 to produce a total density value for central pixel 723. FIG. 6(d) shows numerically the application of the filter 710 to the region 727. Referring to the numerical calculation shown in FIG. 6(d), the region 727 has a total density value of 2.2. The filter 710 is applied to every 3×3 region within the cluster array 705. FIG. 6(e) shows schematically an array 733 of total density values for the cluster array 705. Each value in the array 733 corresponds to a respective pixel in the cluster array 705 and represents the total density value of the region centered around the respective pixel. For example, element 736 corresponds to pixel 723 and contains the value 2.2, which represents the total density value associated with region 727. Element 738 corresponds to pixel 724 and contains the value 4.5, which represents the total density value of the region centered around pixel 724.

The pixel within the cluster array having the highest total density value is identified, and the surrounding region is determined to be the largest cluster. Referring to FIG. 6(e), 4.5 is the highest total density value in the array 733, indicating that the region centered around the corresponding pixel 724 is the largest cluster in the cluster array 705.

In step 552, the homogeneous pattern generator 520 removes the cluster pixel located in the center of the largest cluster. In the preferred implementation, removal of the cluster pixel is achieved by identifying the cluster pixel located in the center of the largest cluster, and changing its value from one to zero. If the central pixel in the largest cluster is a void pixel, a cluster pixel is removed from the next-largest cluster that has a cluster pixel at its center. In an alternative implementation, a pixel within the largest cluster that is not centrally located may be removed.

Identification of Largest Void

In step 553, the homogeneous pattern generator 520 identifies the largest void in the cluster array. In the preferred implementation, the filter utilized to identify the largest cluster is also used to identify the largest void. Total density values for each region within the cluster array are examined and the region having the smallest total density value is identified as the largest void.

In step 555, a cluster pixel is placed in the largest void. In the preferred implementation, a cluster pixel is placed in the largest void by identifying the void pixel located in the center of the largest void and changing its value from zero to one. If the central pixel of the largest void is a cluster pixel, a cluster pixel is placed in the next-largest void that has a void pixel at its center. In an alternative implementation, a pixel within the largest void that is not centrally located may be removed.

If step 554 determines that the largest void is the region from which a cluster pixel was just removed, then step 556 restores the cluster pixel to its location in the center of the region and the process for forming the cluster array is complete. Otherwise, the homogeneous pattern generator 520 returns to step 551 and examines the modified cluster array, identifies the largest cluster and repeats the process. The homogeneous pattern generator 520 continues to move cluster pixels from the largest cluster to the largest void until the step of removing a cluster pixel from the largest cluster creates the largest void. When this occurs, the method proceeds to step 556 as explained above and the process is complete. The modified cluster array is referred to as the homogeneous pattern.

FIGS. 7(a)–7(c) show the first frame 782, the second frame 783 and the third frame 784 of a homogeneous pattern generated from the initial pattern shown in FIGS. 4(a)–4(c). FIG. 7(d) shows an image generated by averaging the values in frames 782, 783 and 784. In step 557, the homogeneous pattern is stored in memory, if necessary.

Dither Matrix Generator

Steps 560–576 are performed by the dither matrix generator 540. In the preferred implementation, the dither matrix generator 540 receives data representing the homogeneous pattern from path 525. In this implementation, the dither matrix generator 540 defines a M×N×T cluster array, which serves the same function as the cluster array used by the homogeneous pattern generator 520. In step 560, the dither matrix generator 540 copies the homogeneous pattern into the cluster array by assigning to each pixel in the cluster array the value of the corresponding pixel in the homogeneous pattern. Using the homogeneous pattern as a starting point for the dither matrix generator 540 has been found to be advantageous due to its homogeneous distribution. In other implementations, different patterns may be loaded into the cluster array within the dither matrix generator 540. In step 561, the dither matrix generator 540 establishes a variable RANK that indicates the number of cluster pixels that are currently present in the cluster array. For example, in the preferred implementation, if the homogeneous pattern contains Q cluster pixels, RANK is assigned an initial value equal to Q.

The dither matrix generator 540 defines a second M×N×T array, referred to as the "dither matrix," comprising M×N×T elements. Because the dither matrix and the cluster array have the same dimensions, there is a correspondence between an element in the dither matrix having coordinates (i,j) and the pixel in the cluster array that has coordinates (i,j).

Values are assigned to elements in the dither matrix in two stages. In the first stage, according to steps 563 and 564, the dither matrix generator 540 identifies the largest cluster in the cluster array, identifies a pixel located in the cluster and assigns a rank value equal to the variable RANK to the element in the dither matrix corresponding to the pixel. In step 565, the cluster pixel is then removed from future consideration. In the preferred implementation, the identification and removal of the cluster pixel is achieved by identifying the central pixel of the largest cluster and changing its value from one to zero. If the central pixel of the largest cluster is a void pixel, the central pixel of the next-largest cluster is identified and removed. In step 566, the variable RANK is reduced by one, reflecting the removal of one cluster pixel from the cluster array. The process is repeated until the cluster array contains no cluster pixels, as determined in step 562. The process produces Q unique rank values (from Q down to 1) assigned to selected elements in the dither matrix.

The second stage assigns rank values from Q+1 up to M×N×T to elements in the dither matrix. The second stage begins with step 570, in which the dither matrix generator 540 again copies the homogeneous pattern into the cluster array. In step 571, the value of RANK is reset to Q, reflecting the number of cluster pixels in the cluster array. In steps 573 and 574, the dither matrix generator 540 identifies the largest void in the cluster array, identifies a void pixel within the largest void and inserts a cluster pixel at the location of the void pixel. In the preferred implementation, a cluster pixel is inserted by identifying the central pixel in the largest void and changing its value from zero to one. In steps 575 and 576, the dither matrix generator 540 increases the value of RANK by one, reflecting the addition of one cluster pixel to the cluster array, and assigns a rank value equal to the adjusted value of RANK in the element in the dither matrix corresponding to the central pixel. The process is repeated until the cluster array contains only cluster pixels, as determined in step 572. The end result of the two-stage process is a dither matrix containing M×N×T unique values.

Normalization

The process outlined above produces a M×N×T dither matrix containing M×N×T unique rank values. If L rank values are desired instead of M×N×T, each rank value R may be converted to a normalized rank value R' by applying the following formula:

$$R' = int\left\{\frac{R}{(M \times N \times T)/L}\right\} \quad (1)$$

In the formula set forth above, int{x} generates an integer value by rounding down, i.e., by truncating all digits in the argument x located to the right of the decimal point.

Choice of Filter

The selection of a filter influences the behavior and appearance of the 3-D image and therefore is an important element of the 3-D screen implementation. One implementation uses a Guassian filter defined as follows:

$$f(x, y, t) = e^{-(x^2+y^2+t^2)/2\sigma^2} \quad (2)$$

FIGS. 8(a) and 8(b) show example values of the Gaussian filter defined above using a 5×5×3 filter window representing 5×5 pixels in two spatial dimensions and 3 frames in the temporal dimension. FIG. 8(a) shows values of f(x,y,t) for t=0. FIG. 8(b) shows values of f(x,y,t) for t=±1. Referring to FIGS. 7(a)–7(c), the homogeneous pattern made up of frames 782, 783 and 784 is generated by applying the Gaussian filter defined by equation (2) above to the initial pattern shown in FIGS. 4(*a*)–4(*c*).

Because the Gaussian filter treats spatial and temporal information equally, it is not finely adapted to the human visual system, which processes spatial and temporal information differently. An alternative filter that addresses this difference is defined by the equations set forth below:

$$f(x, y, t) = \begin{cases} e^{-(x^2+y^2)/2\sigma^2}, & t = 0 \\ \dfrac{\alpha}{1+t^2}\delta(x, y), & t \neq 0 \end{cases} \quad (3)$$

where $$\delta(x, y) = \begin{cases} 1, & x = 0, y = 0 \\ 0, & \text{otherwise} \end{cases} \quad (4)$$

and $\alpha$ is a real number.

The $e^{-(x^2+y^2/2\sigma^2)}$ term influences spatial homogeneity and the $$\frac{\alpha}{1+t^2}\delta(x, y)$$

term influences the pattern's behavior in the temporal dimension. FIGS. 9(*a*) and 9(*b*) show example values of the filter defined by equations (3) and (4) using a 5×5×3 filter window, with σ=1.0. FIG. 9(*a*) shows values of f(x,y,t) for t=0. FIG. 9(*b*) shows values of f(x,y,t) for t=±1. In FIG. 9(*b*), the value for $\alpha$ is not specified. The filter shown by FIGS. 9(*a*) and 9(*b*) produces different visual patterns depending on the value of $\alpha$. Increasing the value of a tends to produce patterns having a more uniform appearance. This result may be useful if the refresh rate is high. It has been observed that among various patterns displaying the same average intensity over a specified number of frames, those patterns that display greater uniformity are perceived as more visually pleasing. FIGS. 10(*a*)–10(*c*) show three frames 906, 907 and 908 of a homogeneous pattern generated from the initial pattern shown by FIGS. 4(*a*)–4(*c*) using the filter defined by equations (3) and (4) with $\alpha$=2.0. FIG. 10(*d*) shows an image generated by cycling frames 906, 907 and 908.

If $\alpha$=0.0, the filter function gives no weight to preceding or succeeding frames, but computes output values for each individual frame independently. FIGS. 11(*a*)–11(*c*) show three frames 911, 912 and 913 of a homogeneous pattern generated from the initial pattern shown by FIGS. 4(*a*)–4(*c*) with $\alpha$=0.0. FIG. 11(*d*) shows an image generated by cycling frames 906, 907 and 908.

If $\alpha$<0, the filter function tends to produce frames that differ very little or not at all. This result may be useful if frames are cycled slowly because visible differences between frames may produce an undesirable "flicker" if the refresh rate is low. FIGS. 12(*a*)–12(*c*) show three frames 916, 917 and 918 of a homogeneous pattern generated from the initial pattern shown by FIGS. 4(*a*)–4(*c*) with $\alpha$=−0.6. The dot pattern is identical in all three frames. FIG. 12(*d*) shows an image generated by cycling frames 906, 907 and 908.

What is claimed is:

1. A method for generating a three-dimensional dither matrix for use in representing one or more color levels in an image, the three dimensions comprising two spatial coordinates and a time coordinate, wherein the method comprises:

(a) receiving data representing a two-dimensional array of pixels, wherein each pixel has a value and each pixel is assigned based on its value either to a first set comprising cluster pixels arranged in clusters or to a second set comprising void pixels arranged in voids;

(b) defining a two-dimensional dither matrix comprising a plurality of elements, wherein each pixel within the array has a corresponding element in the dither matrix;

(c) determining a value for each element in the dither matrix that corresponds to a cluster pixel by identifying a cluster pixel located in a largest cluster within the array, updating a rank value that indicates an order in which the cluster pixels are identified, generating a value for the corresponding element in the dither matrix based on the rank value, and removing the cluster pixel from the first set; and (d) determining a value for each element in the dither matrix that corresponds to a void pixel by identifying a void pixel located in a largest void within the array, updating a rank value that indicates an order in which void pixels are identified, generating a value for the corresponding element in the dither matrix based on the rank value, and removing the void pixel from the second set; and (e) performing (a), (b), (c), and (d) for a plurality of two dimensional arrays of pixels; and (f) forming the three-dimensional dither matrix as a plurality of two-dimensional dither matrices resulting from (e) along a time axis with each of the plurality of two-dimensional dither matrices having a different time coordinate value.

2. The method of claim 1 wherein initial values of pixels within the array are determined by:

receiving data representing a two-dimensional initial pattern of pixels, wherein each pixel has a value and each pixel is assigned based on its value either to a first set comprising cluster pixels arranged in clusters, or to a second set comprising void pixels arranged in voids; and adjusting the values of the pixels in the initial pattern by repeatedly identifying a cluster pixel located in a largest cluster within the initial pattern, reassigning the cluster pixel from the first set to the second set, identifying a void pixel located in a largest void within the initial pattern, and reassigning the void pixel from the second set to the first set.

3. The method of claim 1 wherein each pixel in the array has a binary value.

4. The method of claim 1 wherein the step of updating the rank value is achieved by decreasing the rank value by one for each cluster pixel removed from the first set and increasing the rank value by one for each void pixel removed from the second set.

5. An apparatus comprising memory and processing circuitry coupled to the memory wherein the processing circuitry is adapted to:

(a) receive data representing a three-dimensional array of pixels, wherein each pixel has a value and each pixel is assigned based on its value either to a first set comprising cluster pixels arranged in clusters or to a second set comprising void pixels arranged in voids;

(b) define a three-dimensional dither matrix comprising a plurality of elements, wherein each pixel within the array has a corresponding element in the dither matrix;

(c) determine a value for each element in the dither matrix that corresponds to a cluster pixel by identifying a cluster pixel located in a largest cluster within the array, updating a rank value that indicates an order in which the cluster pixels are identified, generating a value for the corresponding element in the dither matrix based on the rank value, and removing the cluster pixel from the first set; and (d) determine a value for each element in the dither matrix that corresponds to a void pixel by identifying a void pixel located in a largest void within the array, updating a rank value that indicates an order in which void pixels are identified, generating a value for the corresponding element in the dither matrix based on the rank value, and removing the void pixel from the second set;

(e) perform (a), (b), (c), and (d) for a plurality of two dimensional arrays of pixels; and (f) form the three-dimensional dither matrix as a plurality of two-dimensional dither matrices resulting from (e) along a time axis with each of the plurality of two-dimensional dither matrices having a different time coordinate value.

6. The apparatus of claim 5 wherein initial values of pixels within the array are determined by:

receiving data representing a two-dimensional initial pattern of pixels, wherein each pixel has a value and each pixel is assigned based on its value either to a first set comprising cluster pixels arranged in clusters, or to a second set comprising void pixels arranged in voids; and adjusting the values of the pixels in the initial pattern by repeatedly identifying a cluster pixel located in a largest cluster within the initial pattern, reassigning the cluster pixel from the first set to the second set, identifying a void pixel located in a largest void within the initial pattern, and reassigning the void pixel from the second set to the first set.

7. The apparatus of claim 5 wherein each pixel in the array has a binary value.

8. The apparatus of claim 5 wherein the step of updating the rank value is achieved by decreasing the rank value by one for each cluster pixel removed from the first set and increasing the rank value by one for each void pixel removed from the second set.

9. A medium readable by a device embodying a program of instructions for execution by the device to perform a method for generating a three-dimensional dither matrix for use in representing one or more color levels in an image, the three dimensions comprising two spatial coordinates and a time coordinate, wherein the method comprises:

(a) receiving data representing a two-dimensional array of pixels, wherein each pixel has a value and each pixel is assigned based on its value either to a first set comprising cluster pixels arranged in clusters or to a second set comprising void pixels arranged in voids;

(b) defining a two-dimensional dither matrix comprising a plurality of elements, wherein each pixel within the array has a corresponding element in the dither matrix;

(c) determining a value for each element in the dither matrix that corresponds to a cluster pixel by identifying a cluster pixel located in a largest cluster within the array, updating a rank value that indicates an order in which the cluster pixels are identified, generating a value for the corresponding element in the dither matrix based on the rank value, and removing the cluster pixel from the first set; and (d) determining a value for each element in the dither matrix that corresponds to a void pixel by identifying a void pixel located in a largest void within the array, updating a rank value that indicates an order in which void pixels are identified, generating a value for the corresponding element in the dither matrix based on the rank value, and removing the void pixel from the second set; and (e) performing (a), (b), (c), and (d) for a plurality of two dimensional arrays of pixels; and (f) forming the three-dimensional dither matrix as a plurality of two-dimensional dither matrices resulting from (e) along a time axis with each of the plurality of two-dimensional dither matrices having a different time coordinate value.

10. The medium of claim 9 wherein initial values of pixels within the array are determined by:

receiving data representing a two-dimensional initial pattern of pixels, wherein each pixel has a value and each pixel is assigned based on its value either to a first set comprising cluster pixels arranged in clusters, or to a second set comprising void pixels arranged in voids; and adjusting the values of the pixels in the initial pattern by repeatedly identifying a cluster pixel located in a largest cluster within the initial pattern, reassigning the cluster pixel from the first set to the second set, identifying a void pixel located in a largest void within the initial pattern, and reassigning the void pixel from the second set to the first set.

11. The medium of claim 9 wherein each pixel in the array has a binary value.

12. The medium of claim 9 wherein the step of updating the rank value is achieved by decreasing the rank value by one for each cluster pixel removed from the first set and increasing the rank value by one for each void pixel removed from the second set.

* * * * *